United States Patent [19]

Sterzel

[11] Patent Number: 5,073,319

[45] Date of Patent: Dec. 17, 1991

[54] PREPARATION OF THERMOPLASTIC COMPOSITIONS FILLED WITH CERAMIC POWDERS AND OXIDIC SINTER ADDITIVES

[75] Inventor: Hans-Josef Sterzel, Dannstadt-Schauernheim, Fed. Rep. of Germany

[73] Assignee: BASF Aktiengesellschaft, Ludwigshafen, Fed. Rep. of Germany

[21] Appl. No.: 580,858

[22] Filed: Sep. 11, 1990

[30] Foreign Application Priority Data

Sep. 22, 1989 [DE] Fed. Rep. of Germany ....... 3931654

[51] Int. Cl.$^5$ ................... B29C 47/00; B29C 47/76
[52] U.S. Cl. .................... 264/101; 264/211; 264/211.23
[58] Field of Search ............... 264/63, 101, 102, 211, 264/211.21, 211.23, 349, 211.11; 523/340, 348; 528/480, 501, 502

[56] References Cited

U.S. PATENT DOCUMENTS

| | | | |
|---|---|---|---|
| 3,523,916 | 8/1970 | Needham et al. | 264/211 X |
| 4,360,489 | 11/1982 | Tusim | 264/211 |
| 4,965,039 | 10/1990 | Schuetz | 264/63 X |

FOREIGN PATENT DOCUMENTS 3637506 5/1988 Fed. Rep. of Germany .

*Primary Examiner*—Leo B. Tentoni
*Attorney, Agent, or Firm*—Keil & Weinkauf

[57] ABSTRACT

A thermoplastic composition containing a ceramic powder per volume fill level of from 40 to 80% together with an oxidic sinter additive is prepared by melting the thermoplastic in a first zone of a mixing section consisting of a plurality of zones, admixing the molten plastic in the adjoining second zone with a suspension of a ceramic powder in an organic solvent which contains a hydrolyzable precursor compound of the oxidic sinter additive in solution, hydrolyzing the precursor compound in the third zone by adding water, removing the solvent and any volatile hydrolysis products by distillation under reduced pressure in the fourth zone, and compressing and extruding the melt containing the ceramic powder from the fifth zone.

6 Claims, No Drawings

PREPARATION OF THERMOPLASTIC COMPOSITIONS FILLED WITH CERAMIC POWDERS AND OXIDIC SINTER ADDITIVES

BACKGROUND OF THE INVENTION

Ceramic parts made of silicon nitride, silicon carbide or aluminum oxide combine high strength at temperatures up to 1500° C. with a relatively high fracture toughness and a high thermal shock resistance. For this reason they are already being widely used in apparatus construction, as heat exchangers or in engine construction. To manufacture large numbers of parts with complex shapes, increasing use is made of the injection molding process. This is done for example by mixing the ceramic powders with thermoplastics and processing the compositions, which have a ceramic powder content of more than 50% by volume, into green parts by injection molding. Thereafter the polymer matrix is removed from the green parts, for example by pyrolysis, and the green parts are then sintered to give the actual ceramic structures. Extrusion processes make it possible to make pipes, profiles or ribbons.

It is known that crystalline silicon nitride or silicon carbide powder is sinterable to mechanically stable articles only in the presence of sinter aids. Such sinter aids for silicon nitride are aluminum oxide, boron oxide, magnesium oxide and/or rare earth oxides, preferably yttrium oxide, in amounts of from 2 to 10% by weight, based on the silicon nitride. Silicon carbide is sintered not only with about 1% by weight of carbon but also with either 1% by weight of aluminum oxide or 1% by weight of boron oxide. In the case of aluminum oxide small amounts - less than 1% by weight - of silicon dioxide or magnesium oxide are used to avoid particle boundary growth. According to the latest school of thought, sinter aids combine with the boundary regions of silicon nitride powder particles to form an amorphous glassy phase in which inter-particulate mass transfer and hence the sintering together take place. Ideally, the silicon nitride particles should be surrounded for this purpose by a thin boundary zone of sinter aids. Customarily, the silicon nitride particles have dimensions of 1 $\mu$m, and the sinter aid particles are roughly the same size. This results in a poor distribution of sinter aids and hence in local excess and deficient concentrations To make up for deficient concentration, more sinter aid is added to a batch than actually necessary. This increases the proportion of the intergranular glass phase in the sintered part. However, the increase in the glass phase content means a decrease in the temperature resistance, corrosion resistance, the resistance to subcritical crack growth and creep resistance.

One way of applying sinter aids uniformly comprises for example mixing the ceramic powder with a metal alkoxide dissolved in an organic solvent, drying the mixture and then hydrolyzing the metal alkoxide. The process has the disadvantage that many alkoxides are volatile, which leads to handling problems (DE-A-3,637,506). Another method comprises treating the ceramic powders with aqueous solutions of salts of the sinter aid which can be converted thermally into the corresponding oxides.

It is an object of the present invention to provide a process for preparing thermoplastic compositions filled with ceramic powders and oxidic sinter additives which avoids the disadvantages of existing processes and makes it possible to prepare in one operation thermoplastic compositions which contain ceramic powders modified with oxidic sinter additives.

SUMMARY OF THE INVENTION

We have found that this object is achieved according to the present invention by melting the thermoplastic in a first zone of a mixing section consisting of a plurality of successive zones, admixing the molten plastic in an adjoining second zone with a suspension of a ceramic powder in an organic solvent which contains a hydrolyzable precursor compound of the oxidic sinter additive in solution, adding the amount of water required for hydrolyzing the precursor compound in a to the mixture third zone, removing the solvent and any volatile hydrolysis products under reduced pressure in a fourth zone, and compressing and extruding the melt containing the ceramic powder from a fifth zone.

DESCRIPTION OF PREFERRED EMBODIMENTS

The process according to the present invention is carried out in conventional extruders whose conveying, kneading and mixing elements are assembled in modular fashion as required. Preference must be given to twin-screw extruders, since they are self-cleaning and exhibit a narrow residence time spectrum. The thermoplastic granules are introduced into the most extreme part of the extruder. It is followed by the melting zone. The powder suspension containing the dissolved precursor compounds is only pumped in when the mass is molten. This avoids contact between the powder suspension and the still unplasticized thermoplastic and increased metal abrasion at this point owing to the high shearing forces. It is also possible to pump the precursor compound into a further mixing zone of the extruder separately from the powder suspension.

The confluence of melt and suspension is followed by a mixing zone in which the suspension and the melt are homogeneously mixed. In the next zone, the melt is admixed with the amount of water required for hydrolyzing the precursor compounds, and hydrolyzed. The water may also contain boric acid if boron trioxide is to be introduced as a sinter aid for silicon carbide. The particle size of the sinter additives produced in the extruder is from 5 to 100 nm, depending on the processing conditions. The particle size can be controlled by adding not pure water but a dilution of water with a water-miscible organic solvent, such as N-methylpyrrolidone, dimethylformamide, N,N-dimethylformamide, acetamide, i-propanol, ethylene glycol, butanediol or monohydroxy-glycol ethers. We have found that the higher the dilution of the water with these solvents, the smaller the sinter additive particles. Conversely, the particle size can also be controlled by including ammonia in the water, in which case an increasing ammonia content also means an increase in particle size. Thereafter the solvent and the alcohol formed by hydrolysis are distilled off under reduced pressure via one or more devolatilization domes. This is followed by a compression zone in which the melt which has been substantially freed of solvent is compressed before it is extruded through dies. The extrudates are cooled and chopped into granules.

Suitable thermoplastics are for example polyacrylates, ethylcellulose, ABS, hydroxypropylcellulose, high and low density polyethylene, oxidized polyethylene, cellulose acetate, polyamides, ethylene/acrylic acid copolymers, cellulose acetobutyrate, polystyrenes, polybutylene, polysulfones, polyethylene glycols and polyethylene oxides. It is particularly advantageous to use polyoxymethylene and copolymers thereof.

According to the present invention, the molten plastic is mixed in the second zone with a suspension of a ceramic powder in an organic solvent. Suitable ceramic powders are for example the oxides, nitrides and carbides of elements of main or subgroups 3 and/or 4 of the periodic table, e.g. preferably silicon carbide, silicon nitride or aluminum oxide. However, particular preference is given to silicon nitride. The ceramic powders advantageously have a particle size of $\leq 5$ μm, preferably from 0.2 to 2 μm. These ceramic powders are suspended in an organic solvent which is capable of dissolving the particular plastic used. Examples are decalin or xylene for polyethylene and polyethylene/wax mixtures, diglycol dimethyl ether for polystyrene and copolymers with acrylonitrile or benzyl alcohol for polyethylene terephthalate, polybutylene terephthalate, nylon 6 or 6.6, polyoxymethylene or polysulfones.

The suspensions further contain dissolved hydrolyzable precursor compounds of the oxidic sinter additives. Suitable oxidic sinter additives are in particular aluminum oxide, magnesium oxide, yttrium oxide and silicon dioxide.

The precursor compounds of the oxidic sinter additives are used either as alkoxides or as solutions of carboxylates, with or without stabilization through additionally incorporated complexing agents.

The alkoxides used are, for example aluminum alkoxides such as aluminum isopropoxide or aluminum sec-butoxide; yttrium alkoxides such as yttrium isopropoxide; magnesium alkoxides such as magnesium ethoxide or magnesium propoxide, optionally dissolved, on account of the high melting points of from 200 to 300° C., in solvents such as diethyl glycol dimethyl ether; and silicon alkoxides such as tetraethyl silicate. The carboxylates used are for example formates, acetates and propionates but also the salts of higher carboxylic acids such as stearates and also the salts of polybasic carboxylic acids or hydroxycarboxylic acids such as citrates of the metals aluminum, magnesium or yttrium. Additional complexing agents are for example citric acid, alkanolamines and aliphatic diamines or triamines.

If necessary, the suspensions are prepared by subjecting the ceramic powders to a deagglomerating treatment under the action of shearing forces, for example in ball mills, in the presence or absence of dispersants. The percentage volume of powder in the suspending medium is dictated by optimizing the conditions: on the one hand, it should be very high in order that very little solvent need be distilled off in the extruder; on the other, the viscosity of the suspension must not impair the process of deagglomeration. In addition, the suspension must still be pumpable. We have found that volume contents of from 10 to 35%, preferably from 25 to 33%, give optimum results. If deagglomeration must take place with volume contents below 25%, the suspension can be concentrated by partially evaporating the solvent. It is also possible to carry out the deagglomeration in a low-boiling suspending medium or suspending medium mixture at low volume contents and then to add a higher-boiling suspending medium which is miscible with the low-boiling suspending medium and to distil off the low-boiling suspending medium or media.

This technique is advisable in particular when the actual suspending medium possesses increased density and/or viscosity and hence makes it difficult to achieve deagglomeration by milling.

Surprisingly, no reagglomeration of the powders occurs in the process according to the present invention. The degree of deagglomeration achieved in the suspension stage persists through the rest of the process.

The residence time in the extruder is only from 1 to 5 minutes, so that the thermoplastic is hardly damaged and virtually no loss of molecular weight occurs. Moreover, the degree of abrasion is extremely small.

The process according to the present invention makes it possible to prepare nonporous thermoplastic compositions having a volume fill level of 40 to 80% of ceramic powder. The ceramic powders are in the state of homogeneous distribution in the thermoplastic composition.

An essential advantage of the process is its high efficiency. In a single operation, substantially agglomerate-free ceramic injection molding compositions containing very finely divided sinter additives are produced at high hourly throughputs.

The examples which follow illustrate the advantages of the invention.

COMPARATIVE EXAMPLE 1

A suspension of 670 ml of benzyl alcohol, 1.2 g of hydroxystearic acid and 330 ml (1023 g) of silicon nitride powder of particle size 0.5–1.5 μm was deagglomerated by milling in a stirred ball mill. The resulting, readily pumpable suspension was admixed with 96.6 g of aluminum tri-sec-butoxide and 75.6 g of yttrium triisopropoxide, giving, after hydrolysis had taken place, 20 g of aluminum oxide and 45 g of yttrium oxide. A mixture of 36.2 ml of water and 90 ml of i-propanol was then stirred in. The suspension became very viscous and was no longer stirrable.

EXAMPLE 2

A stirred ball mill was used to mill 100 kg of silicon nitride of particle size 0.5–1.5 μm in 70 l of benzyl alcohol, to which 1.2 kg of hydroxystearic acid had been added, for 3 hours until agglomerate-free. The particle size distribution had a peak at 0.9 μm. Following deagglomeration, 9.75 kg of aluminum sec-butoxide and 6.77 kg of yttrium isopropoxide were dissolved in the suspension to produce 2.02 kg of aluminum oxide and 4.0 kg of yttrium oxide following hydrolysis and heat treatment.

The mixture thus obtained was pumped at a rate of 26.4 l/h to a twin-screw extruder and mixed therein at 190° C. with a polyoxymethylene melt, melted and conveyed in the extruder at a rate of 8.0 kg/h. The polyoxymethylene used had a melt flow index of 13 g/10 min, measured in accordance with German Standard Specification DIN 53479 at 190° C. under a load of 2.1 kg.

The mixture of polyoxyethylene melt and deagglomerated silicon nitride dispersion was admixed following a mixing time of from 20 to 30 seconds in the extruder with a mixture of 0.9 l of water and 0.9 l of N-methylpyrrolidone pumped in at a rate of 1.8 l/h.

In the subsequent devolatilization part of the extruder, the benzyl alcohol, sec-butanol, isopropanol and N-methylpyrrolidone were evaporated off under a pressure of from 10 to 30 mbar. The extrudates forced through dies were cooled and granulated. The granules were 70% by volume silicon nitride, $Al_2O_3$ or aluminum oxide hydrate, $Y_2O_3$ or yttrium oxide hydrate and also polyoxymethylene and hydroxystearic acid. The aluminum oxide and yttrium oxide particles were around 30 nm in size.

EXAMPLE 3

Example 1 was repeated, except that a mixture of 0.9 l of water and 2.3 l of N-methylpyrrolidone was pumped in at a rate of 3.2 l/h to hydrolyze the metal alkoxides. The aluminum oxide and yttrium oxide particles were around 15 nm in size.

EXAMPLE 4

Example 1 was repeated, except that a mixture of 0.9 l of water, 0.9 l of N-methylpyrrolidone and 36 g of 25% strength by weight aqueous ammonia solution was pumped in at a rate of 1.8 l/h. The aluminum oxide and yttrium oxide particles were around 15-20 nm in size.

I claim:

1. A process for preparing a thermoplastic composition filled with a ceramic powder and an oxidic sinter additive, which comprises melting the thermoplastic in a first zone of a mixing section consisting of a plurality of successive zones, admixing the molten plastic in an adjoining second zone with a suspension of a ceramic powder in an organic solvent which contains a hyrolyzable precursor compound of the oxidic sinter additive in solution, adding to the mixture in a third zone an amount of water required for hydrolyzing the precursor compound, removing the solvent and any volatile hydrolysis products under reduced pressure in a fourth zone, and compressing and extruding the melt containing the ceramic powder from a fifth zone.

2. The process as defined in claim 1, wherein the added water has been diluted with a water-miscible organic solvent.

3. The process as defined in claim 1, wherein the added water contains ammonia.

4. The process as defined in claim 1, wherein the suspension of a ceramic powder in an organic solvent has been subjected to a deagglomerating treatment under the action of shearing forces.

5. The process as defined in claim 1, wherein the precursor compound is an alkoxide or carboxylate of the elements of the oxidic sinter additive.

6. The process as defined in claim 1, wherein the ceramic powder is silicon carbide and the water used for the hydrolysis contains boric acid to introduce boron trioxide as a sinter aid.

* * * * *